Sept. 22, 1970              J. F. COTTER              3,529,949
DISTRIBUTOR MANIFOLD SYSTEM FOR A TURRET-TYPE
GLASS BURN-OFF MACHINE
Filed April 26, 1967                            4 Sheets-Sheet 2
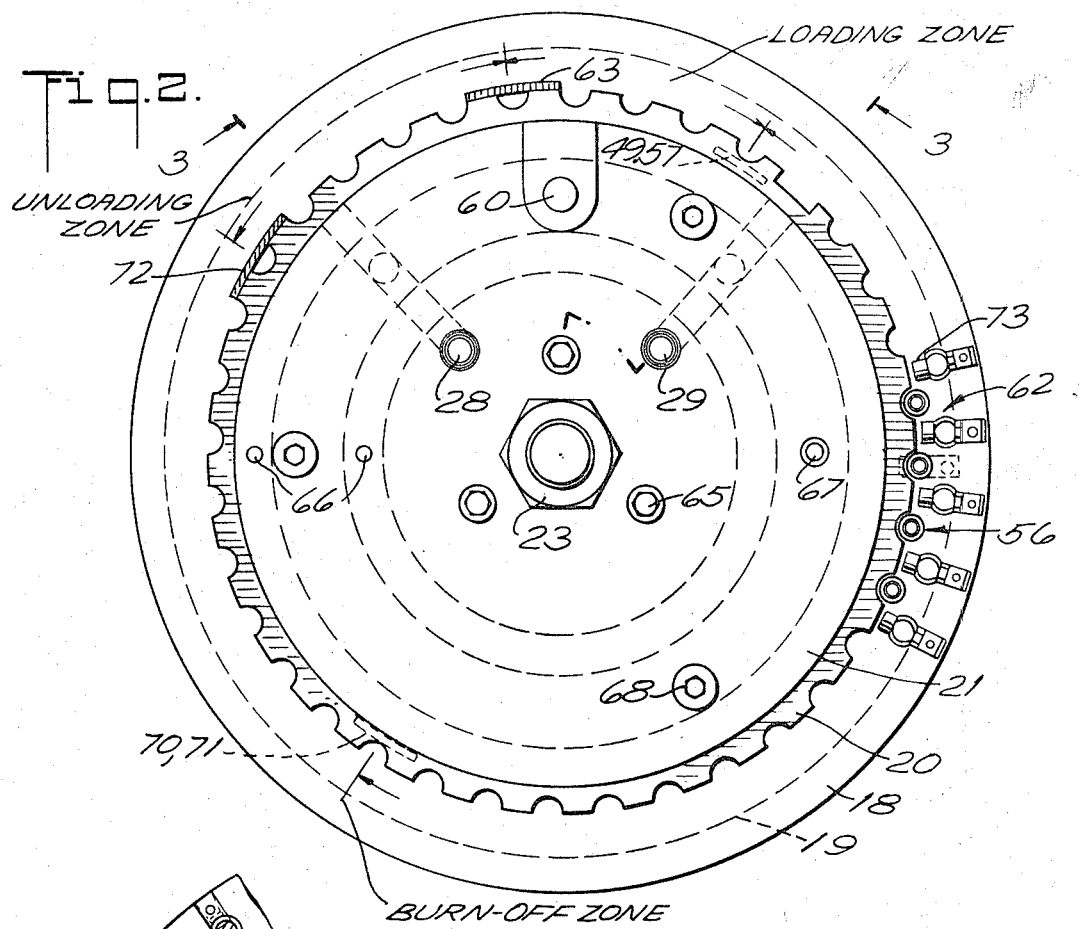
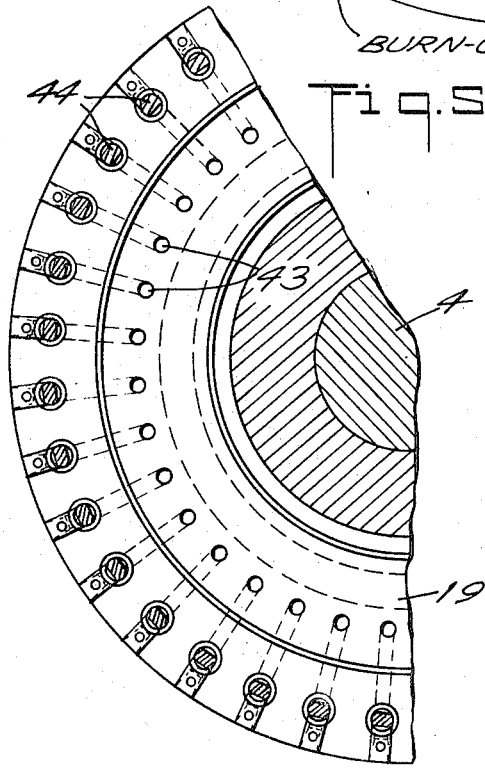
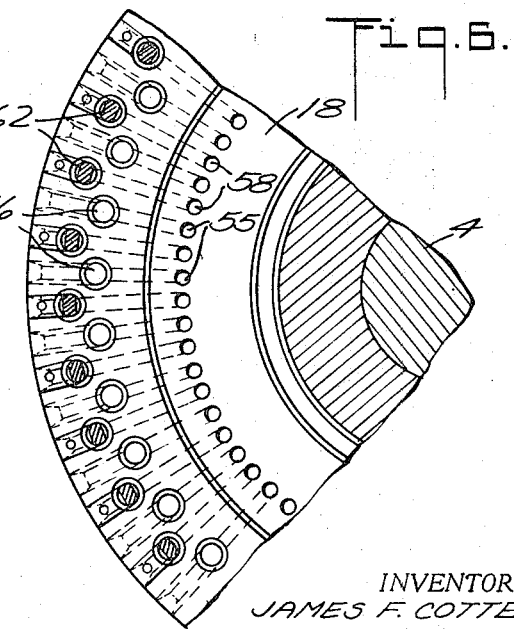
INVENTOR.
JAMES F. COTTER
BY
Norman O. Holland
ATTORNEY

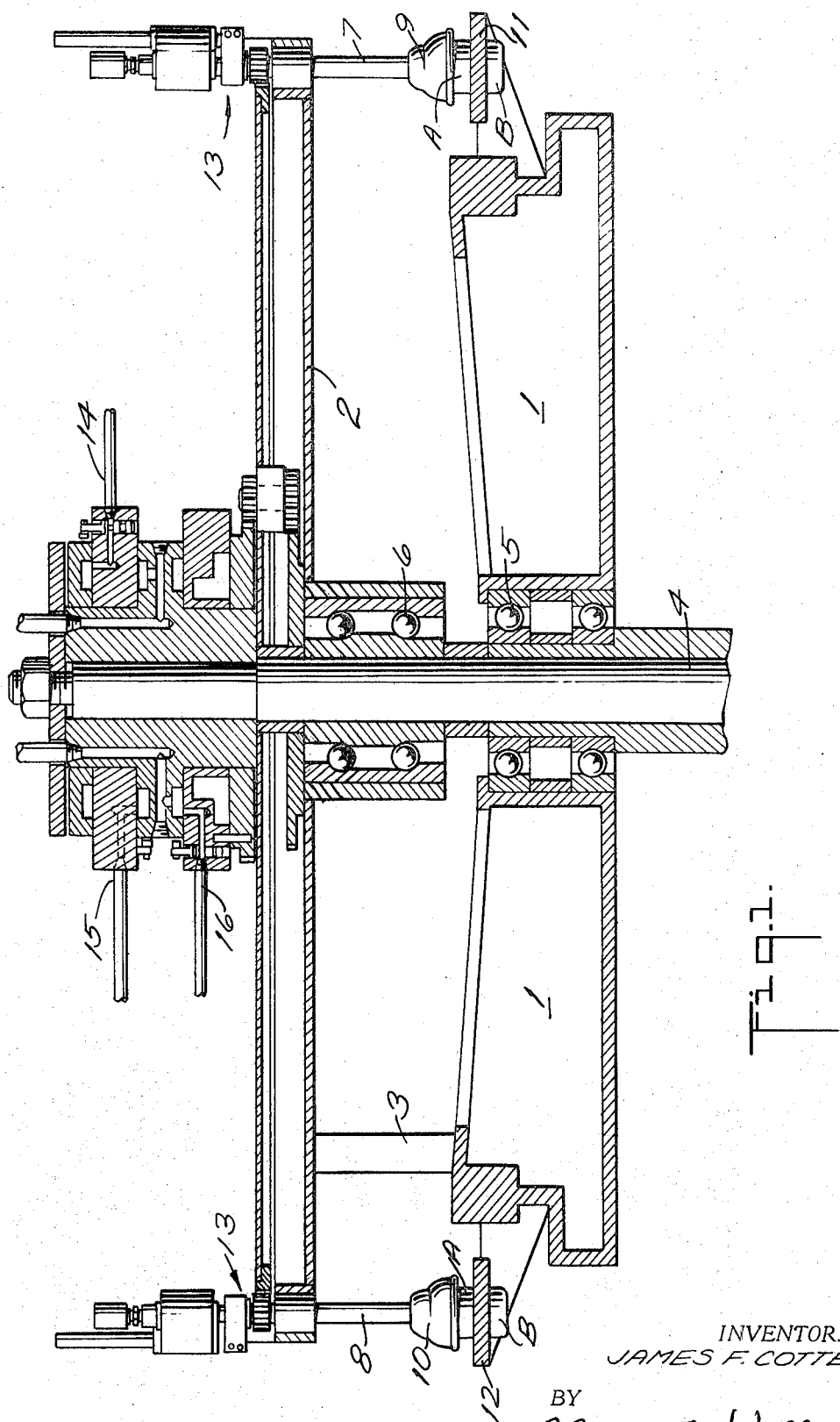

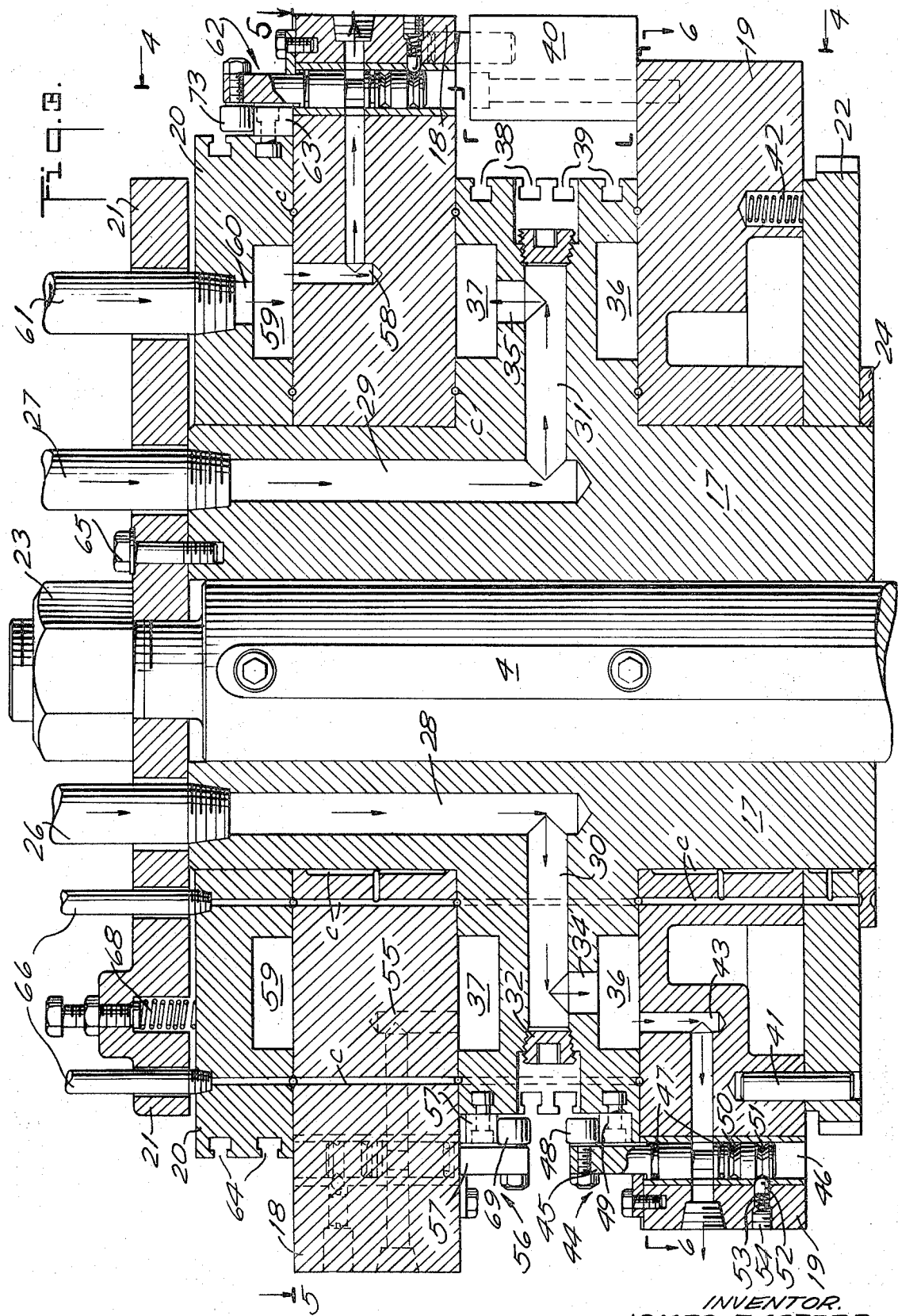

INVENTOR.
JAMES F. COTTER
BY
Norman M Hallard
ATTORNEY

United States Patent Office
3,529,949
Patented Sept. 22, 1970

3,529,949
DISTRIBUTOR MANIFOLD SYSTEM FOR A TURRET-TYPE GLASS BURN-OFF MACHINE
James F. Cotter, Lancaster, Ohio, assignor to Anchor Hocking Corporation, Lancaster, Ohio, a corporation of Delaware
Filed Apr. 26, 1967, Ser. No. 633,830
Int. Cl. C03b 23/00
U.S. Cl. 65—269                                    6 Claims

ABSTRACT OF THE DISCLOSURE

A compact gas distributor system for a rotary machine such as a turret-type glass burn-off machine or the like comprising a fixed axial distributor portion mounted at the top of the turret center post and cooperating annular manifolds mounted about an extended portion of the fixed distributor and rotatable with the turret carrying the gas utilizing operating heads. Cam-operated valves are located in the outlets of the ducts in the rotating annular manifolds and the operating cams for the valves are mounted on an exposed surface of the fixed distributor. Cam mounting slots are provided in the surface of the fixed distributor so that the cams may be slidably positioned for opening and closing the various valves at the desired operating locations around the circular operating path.

BACKGROUND OF THE INVENTION

The present invention involves an improved gas distributor system and particularly a distributor system suitable for use on rotary glassware manufacturing machines such as glass burn-off machines and the like.

Burn-off machines, for example, are used in the glass industry for performing one of the steps in the manufacturing of glassware such as bottles, jars, and tumblers. When such ware is removed from the forming molds an unfinished or crude end is left on each piece. It is the function of the burn-off machine to remove this excess glass, which is called the moil, from the ends of the articles of glassware.

The machine has a 360° cycle and is generally in the form of a large rotating turret with a number of spaced operating heads mounted about its periphery. During rotation of the turret a piece of ware held in each head is inserted in a ring burner or other heater mounted on the turret in cooperating relation with the head. During the rotation of the turret, the burner is fired and the glassware which is rotated within it has the crude end or moil severed by being burned off.

The construction of these burn-off machines generally comprises a center post on which the large turret is rotated. Each of the operating heads comprises a spindle with a vacuum operated ware-holding chuck at its end which is positioned above the ring burner device. Supply lines are provided at each of the operating heads for carrying a vacuum source to the chucks, and gas and oxygen as fuel for the ring burners. In the past the means for controlling the supply of these gases to each head has consisted generally of valve means mounted at the heads. The valves are usually operated by cams or switches or the like which have been located along the path of rotation of the heads at the various points where vacuum cut-off or gas flow has been required. The distributors for communicating the gases to the supply lines have usually been located at various points on the center post in a number of arrangements Among the disadvantages inherent in these machines has been the probem of precision adjustment of the valve controls, as well as the time and labor required in setting and adjusting them. Also since the cut-off valves are located at the outlets of the gas supply lines, gas remains in these lines when they are not operating increasing the possibility of leaks or explosion.

SUMMARY OF THE INVENTION

The present invention is designed to overcome these disadvantages and particularly embodies an improved distributor manifold arrangement which is compact in structure and includes precision adjustable valve controls for the oxygen, gas and vacuum feed systems. These valves are all incorporated in two concentric and compact manifolds located at the top of the machine center post and permit easy, labor-saving maintenance and precise adjustment and control.

The improved distributor system has a central, stationary portion of cylindrical configuration mounted on the center post and two annular manifolds are rotatably mounted on an annular extension on this stationary portion. Spring-held, two-position valves are set into the two rotating manifolds and the operating cams are mounted on the periphery of the stationary portion to give a centrally located means of controlling the gas supply at the inlet of the supply lines.

It is therefore an object of the present invention to provide an improved distributor system for gass burn-off machines.

It is another object of the present invention to provide improved means for controlling the distribution of gases in glass burn-off machines.

It is another object of the present invention to provide a more safely operated glass burn-off machine.

It is another object of the present invention to provide a more precise control system for glass burn-off machines It is a further object of the present invention to provide a more compact gas distributor and control system for glass burn-off machines.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is an elevational view partly in section of the upper part of a glass burn-off machine provided with the improved distributor system of the present invention;

FIG. 2 is a top view of the improved distributor assembly of the present invention;

FIG. 3 is a side view partly in section of the improved distributor assembly taken along the lines 3—3 of FIG. 2;

FIG. 5 is partial view of the lower distributor manifold taken along lines 5—5 of FIG. 3; and FIG. 6 is a partial view of the upper distributor manifold taken along the lines 6—6 of FIG. 3.

DESCRIPTION OF THE PREFERRED EMBODIMENT

Figure 4:
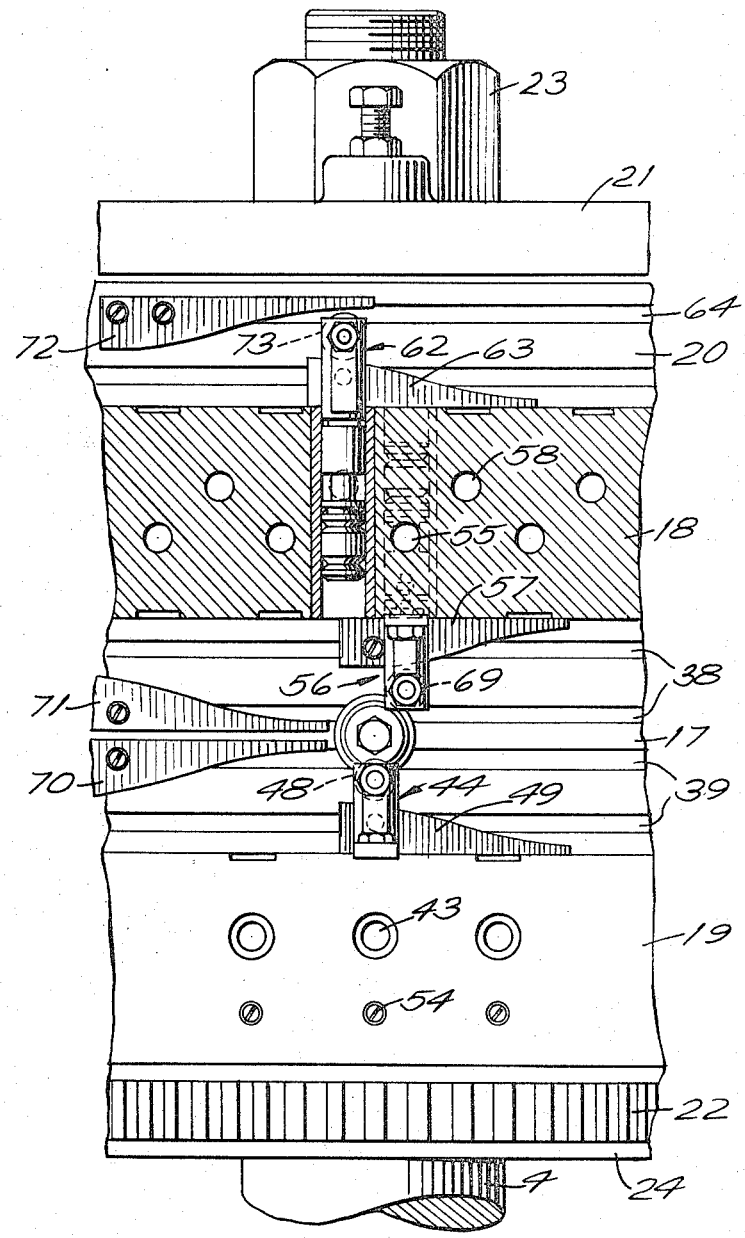
FIG. 4 is a side view partly in section of the improved distributor assembly taken along the lines 4—4 of FIG. 3 and showing the valve and cam arrangements.

A preferred embodiment of the glass burn-off machine of the present invention is shown in FIG. 1. It comprises two large turret members 1 and 2 connected by a column 3 to rotate together on the machine center post 4 on the roller bearings 5 and 6. This machine is of the type having thirty-six operating heads, two of which are shown at each end mounted on the turrets. The upper turret 2 mounts the spindles 7 and 8 having the glassware holding chucks 9 and 10 at their ends and the lower turret 1 carries the cooperating ring burners 11 and 12. Glassware in the form of two tumblers A is shown held in the chucks 9 and 10 with the moil or excess glass B extending below the burners 11 and 12. The ware is rotated in the burners by driving the spindles 7 and 8 through the gear chain 13.

The improved distributor system is shown mounted at the top of the center post 4. The supply lines 14, 15, and 16 communicate the vacuum, gas, and oxygen, respectively, to the operating heads. There is a set comprising one each of these three lines extending to each of the thirty-six operating heads.

The distributor arrangement is shown in greater detail in FIG. 3. The entire unit is mounted compactly at the top of the center post 4. The major parts of the assembly comprise an oxygen and gas distributor section 17 fixed to the center post 4, an upper distributor manifold 18, a lower distributor manifold 19, and a vacuum distributor cap 20, all of which are held between the vacuum upper cap 21 and the drive gear 22 and secured by the large cap screw 23 and the washer 24.

More particularly, the oxygen and gas distributor 17 is of a generally cylindrical shape and has a circumferentially projecting portion 25 located somewhat below its mid point. The oxygen supply from a source of oxygen and the gas supply from a source of an appropriate combustible gas are connected to the distributor 17 through the lines 26 and 27 connected at the top. The oxygen and gas are carried through the vertical ducts 28 and 29 to the ducts 30 and 31 which extend through the projecting portion 25 to the periphery of the distributor 17. These latter ducts 30 and 31 have outlets to the atmosphere which are closed by threaded plugs 32 and 33. They are provided with additional outlets 34 and 35 into the chambers 36 and 37 formed by annular cutouts in the projecting portion 25 of the distributor 17. This projecting portion 25 of the central distributor 17 also has two sets of keyways 38 and 39 formed in its outer surface to accommodate adjustable cams which operate the manifold control valves as will be hereinafter more fully discussed.

The supply lines 14, 15, and 16 while connected to the distributor assembly on the center post must also rotate with the operating heads. They are, therefore, connected at their inlet ends to a manifold system which is mounted for rotation on the fixed central distributor 17. This rotating manifold system comprises an upper distributor manifold 18 and a lower distributor manifold 19 which are connected by the drive rod block 40. The lower manifold 19 is connected to the large drive gear 22 by means of a dowel pin 41. The large gear 22 is driven with the turret 2 and drives the lower distributor manifold 19 which in turn drives the upper distributor manifold 18 through the drive rod block 40. A number of springs such as 42 are mounted within the lower distributor manifold 19 and engage the upper rim of the drive gear 22 to permit some tolerance and relative movement between the two members. Both distributor manifolds 18 and 19 are provided with lubricating channels C through which an oil or other lubricant is supplied to reduce the friction between the rotating parts.

The lower distributor manifold 19 is constructed to conduct the oxygen supply between the fixed central distributor 17 and the oxygen supply lines 16 which connect with the operating heads. This manifold 19 (FIGS. 3 and 5) is provided with a series of L-shaped ducts 43 which open into the annular chamber 36 formed by the cutout in the extended portion 25 of the central distributor 17. At their opposite ends the ducts 43 connect with the inlet of the oxygen supply lines 16 which are connected at the outer surface of this distributor manifold 19.

Two-position valves 44 are provided near each of these outlets and comprises a spool 45 which operates in a vertical bore 46 and is fitted with two sets of sealing O-rings 47. The spool 45 is provided with a roller 48 at its external end which is operated by means of a cam 49 mounted in the peripheral keyway 39 in the central distributor section 17. Its opposite end has two annular grooves 50 and 51 which cooperate with a spring-loaded button 52. The button 52 acts to lock the spool 45 of the valve 44 in an open or closed position by engaging the upper 50 or lower 51 groove, respectively. The operating force of the spring 53 is adjustable by means of a set screw 54 which is accessible in the outer surface of the manifold 19. As this manifold 19 rotates, the cam 49 mounted in the lower keyway of 39 will snap the valve 44 to the open position. A similar cam mounted in the upper keyway of 39 will snap the valve 44 to the closed position.

The upper distributor manifold 18 (FIGS. 3 and 6) is similar in construction to the lower manifold 19. It conducts the vacuum and the gas supply to the operating head supply lines 14 and 15. For the gas supply it has L-shaped ducts 55 which connect with the annular chamber 37 formed by the cutout in the upper surface of the extended portion 25 of the central distributor 17. Similar two-position valves 56 are mounted in these ducts 55 but have their external ends extending through the bottom of the manifold 18 to be operated by the cams 57 mounted in the upper set of keyways 38 in the outer surface of the central distributor 17.

To conduct the vacuum source this upper distributor manifold 18 is provided with further L-shaped ducts 58 which open on to its upper surface. These ducts cooperate with an annular chamber 59 formed by a cutout in the vacuum distributor cap 20. This vacuum distributor cap 20 is fixed to the central distributor 17 and has a duct 60 which communicates between the vacuum source supply line 61 and the annular chamber 59. The vacuum source is thus connected through the upper L-shaped ducts 58 in the upper distributor manifold 18 to the operating head supply line 14 connected at the outer surface of this manifold. Again, similar two-position valves 62 are provided near the outlets of the ducts 58. These valves 62 are operated by cams 63 mounted in peripheral keyways 64 formed in the vacuum distributor cap 20.

An upper cap 21 is provided on the top of the distributor structure and is fixed by cap screws 65 to the central distributor portion 17. It is appropriately bored as may be seen in the top view of the distributor section in FIG. 2 to accommodate the oxygen, gas, and vacuum source supply lines, 26, 27 and 61, the lubrication ports 66, the connecting dowel 67 and the mounting springs 68. The upper mounting springs 68 also accommodate for tolerances in the multi-layered assembly to permit easy rotation of the rotating members.

The operation of the improved burn-off machine with the improved central manifold system may best be described by reference to FIGS. 2 and 4. The upper and lower turrets 1 and 2 of the burn-off machine are caused to continously rotate, carrying the operating heads about a 360° path as indicated in FIG. 2. A conveyor carrying the articles of ware in a line from the molding machine is arranged tangentially at a point on the path of rotation. Each head is turn picks up an article of ware, such as a tumbler, from this conveyor at the loading zone. The individual head carries its tumbler along the path and inserts it within its cooperating ring burner. At a further point in its rotation operating cams 57 and 49 for the gas and oxygen valves 56 and 44 are positioned in the keyways 38 and 39 in the peripheral surface of the oxygen and gas distributor 17. This is the point at the burn-off zone where it is desired to fire the ring burners to sever, by burning off, the excess glass on the end of the tumblers. To accomplish this (FIG. 4), the lower cam 49 is positioned in the keyway 39 at the desired point of operation and snaps the oxygen control valve 44, which has been in the closed position, to the open position. The oxygen supply is thus connected through the oxygen supply line 43 to a mixing chamber at the ring burner. Mouned directly above the oxygen valve operating cam 49 is the gas valve operating cam 57. This cam 57 is set in the upper keyway 38 snapping the gas control valve 56 downwardly by the action of its roller 69 on the cam surface and thereby communicating the gas supply through its supply line 15 to the mixing chamber at the ring burner. The burner is then fired using this gaseous fuel and the excess glass is severed from the tumbler which is rotated within the burner. At the end of the severing operation, two more operating cams are provided at this particular point in the path of travel of the operating heads. An upper cam 70 is provided in the oxygen valve keyway 39 and a lower cam 71 is provided in the gas valve keyway 38 at the desired shut-off point. The oxygen and gas valves 44 and 56 are thus snapped to the off position cutting off the burner fuel after the appropriate burn-off operation has been completed.

At a further point along the path of rotation, it is desired to release the tumbler and place it on a conveyor to be carried for further processing. An appropriate cam 72 is provided in the upper keyway 64 in the vacuum distributor cap 20. The vacuum control valve 62 has been in the open position connecting the vacuum source to the chuck in the operating head for holding the tumbler therein. It is now operated by the action of its roller 73 on the cam surface 72 and is thereby snapped to the off position. The imperfect seal in the chuck will vent the vacuum supply line 14 permitting the tumbler to drop from the holding chuck on to the take out conveyor at the unloading zone.

The empty head with the vacuum cut-off then passes to the beginning point on the rotation path at the loading zone in order to pick up another freshly molded tumbler. The appropriate operating cam 63 is set in the lower keyway of the vacuum distributor cap 20 at this point and snaps open the vacuum control valve communicating the vacuum to the holding chuck when the chuck has been placed over the end of the next tumbler to be processed.

It will thus be seen that an improved distributor arrangement for a burn-off machine has been provided. The operating cams may be set precisely at any point in the path of rotation of the heads by simple sliding adjustment within the appropriate keyways. The valves are quickly opened and closed and travel about a much smaller path than the valves of the prior art which travelled along the outer periphery of the machine with the operating heads. The supply gases are held in the compact central distributor and manifolds and are less prone to leaks or damage.

The complete distributor arrangement provides a compact, easily accessible unit which permits labor-saving valve adjustment and maintenance.

As various changes may be made in the form, construction, and arrangement of the parts disclosed herein without departing from the spirit and scope of the invention and without sacrificing any of its advantages, it is to be understood that all matter herein is to be interpreted as illustrative and not in a limiting sense.

Having thus described my invention, I claim:

1. In a machine for severing moil from glassware having a rotary turret mounted on a center post and carrying a plurality of operating heads, said operating heads comprising a burner assembly and vacuum ware holding chuck, the improvement comprising a distributor manifold system for the feed lines to the operating heads, said system comprising a stationary portion mounted on the center post, said stationary portion containing inlet means and manifold chamber means for both the vacuum and combustible gases for the operating heads, a rotating portion mounted on said stationary portion and rotating with the turret, the outer periphery of said rotating portion being located substantially closer to said center post than to said operating heads, said rotating portion having duct means attached to the feed lines which communicate with the operating heads to bring the vacuum and combustible gases thereto, said duct means communicating with the manifold chamber of said stationary portion during a portion of the rotation of the turret, each of the duct means in said rotating portion having valve means therein adjacent said stationary portion and remote from the operating heads to control the feed of vacuum and combustible gases to the operating heads, valve operating means connected to a portion of said valves and being mounted on a portion of said stationary portion whereby the valves are closed and opened during selected intervals during rotation by said operating means around the center post.

2. The apparatus of claim 1 in which said valve means is mounted adjacent the outlet of said fluid ducts in said rotating portion.

3. The apparatus of claim 1 in which said valve means are snap-action, two-position, spool valves.

4. The apparatus of claim 1 in which said valve operating means are cams mounted on the outside surface of said stationary portion.

5. The apparatus of claim 1 in which annular keyways on the outside surface of said stationary portion accommodate said valve operating means for adjustment.

6. The apparatus of claim 1 in which said rotating portion comprises two annular members riding on said stationary portion.

References Cited

UNITED STATES PATENTS

| | | | |
|---|---|---|---|
| 1,577,536 | 3/1926 | Parker et al. | 65—269 |
| 2,215,980 | 9/1940 | Schreiber | 65—269 |
| 2,537,660 | 1/1951 | Eldred | 65—269 |
| 2,567,033 | 9/1951 | Schutz | 65—269 |
| 2,644,274 | 7/1953 | Bailey | 65—272 |

S. LEON BASHORE, Primary Examiner

J. H. HARMAN, Assistant Examiner

U.S. Cl. X.R.

65—113, 244, 272